United States Patent
Metzger

(10) Patent No.: US 6,905,279 B2
(45) Date of Patent: Jun. 14, 2005

(54) LINE CONNECTOR

(75) Inventor: Andrew T. Metzger, Belle Plaine, KS (US)

(73) Assignee: The Coleman Company, Inc., Wichita, KS (US)

( * ) Notice: Subject to any disclaimer, the term of this patent is extended or adjusted under 35 U.S.C. 154(b) by 14 days.

(21) Appl. No.: 10/460,130

(22) Filed: Jun. 12, 2003

(65) Prior Publication Data

US 2004/0253052 A1 Dec. 16, 2004

(51) Int. Cl.⁷ ................................................. F16D 1/00
(52) U.S. Cl. ..................................... 403/340; 403/282
(58) Field of Search ............................... 403/340, 282; 285/921

(56) References Cited

U.S. PATENT DOCUMENTS

| | | | |
|---|---|---|---|
| 613,663 A | * 11/1898 | Case | ............................. 403/340 |
| 4,878,452 A | 11/1989 | Regan et al. | |
| 6,048,127 A | * 4/2000 | Kern et al. | .............. 403/340 X |
| 6,471,103 B1 | * 10/2002 | Frese et al. | ................... 224/200 |
| 6,627,425 B1 | * 9/2003 | Chen | ........................... 435/196 |

OTHER PUBLICATIONS

West Marine, "Infinity Float," Model 5388574 printed at http://mastercatalog04.westmarine.com/0281.asp?LinkBackProdId=136098 on May 19, 2004.

* cited by examiner

*Primary Examiner*—John R. Cottingham
(74) *Attorney, Agent, or Firm*—Leydig, Voit & Mayer, Ltd

(57) ABSTRACT

Disclosed is a line connector having a line attachment portion, a snap-in portion, a snap-on portion, wherein the snap-in and snap-on portions disposed such that the snap-on portions of first and second line connectors will simultaneously attach onto the snap-in portions of one another along a direction of attachment, and wherein an angle between a direction of attachment is no more than about ninety degrees to an axis of line tension.

13 Claims, 4 Drawing Sheets

LINE CONNECTOR

BACKGROUND OF THE DISCLOSURE

1. Field of the Disclosure

This disclosure relates to quick-release connectors for connecting lines such as ropes and cables.

2. Description of the Related Art

Connecting devices for attaching floating devices, such as life rings, pool inflatables, and inflatable rafts, to one another are known in the art. Generally these comprise a female-type receiver and male-type protuberance on the inflatable, such that the male-type protuberance of one inflatable is inserted and locked within the receiver of another, thereby linking the two inflatables. The male is often a t-shape key that is inserted and twisted within the receiver.

One drawback is the proximity of the inflatables, often making it difficult to access the male and female components to effect the linking and disengagement. Another drawback to close proximity is that, in the case of pool inflatables, the proximity of the two users may be "too close for comfort."

A length of cable between the two inflatables would provide some distance while maintaining a connection that is easily accessible. What is needed is a simple device for quickly connecting and releasing such a line.

BRIEF SUMMARY OF THE DISCLOSURE

Disclosed is a line connector, including a line attachment portion defining a line axis, a snap-in portion, a snap-on portion, wherein the snap-in and snap-on portions may be disposed such that the snap-on portions of first and second line connectors will simultaneously attach onto the snap-in portions of one another along a direction of attachment, and wherein an angle between a direction of attachment is no more than about ninety degrees to an axis of line tension.

In another aspect of the apparatus, the snap-in portion may include a shaft.

In another aspect of the apparatus, the shaft is preferably perpendicular to the snap-on portion, said snap-on portion defining an opening for receiving the shaft.

In another aspect of the apparatus, the angle is preferably less than 90 degrees.

In another aspect of the apparatus, the line axes of the first and second connectors are not congruent with one another.

In another aspect of the apparatus, the line axes of said first and second connectors are congruent with one another.

In another aspect of the apparatus, the line may be permanently molded to the line connector.

Disclosed is a line connector, including means for attaching a line, snap-on means for attaching to a snap-in means of a second line connector, snap-in means for attaching to a snap-on means of the second line connector, wherein the snap-in and snap-on portions disposed such that the snap-on portions of first and second line connectors will simultaneously attach onto the snap-in portions of one another along a direction of attachment, and wherein an angle between a direction of attachment is no more than about ninety degrees to an axis of line tension.

Disclosed is a line connector, including a line attachment portion for connecting a line to a snap-in portion, the snap-in portion including a shaft disposed parallel to a line axis defined by said line attachment portion, a snap-on portion having an opening adapted to receive the snap-in portion of a second line connector, the opening having one or more resilient protuberances narrowing the mouth of the opening to a dimension smaller than that of the shaft, wherein the snap-in and snap-on portions disposed such that the snap-on portions of first and second line connectors will simultaneously attach onto the snap-in portions of one another along a direction of attachment, and wherein an angle between a direction of attachment is no more than about ninety degrees to an axis of line tension.

DETAILED DESCRIPTION OF THE PREFERRED EMBODIMENTS

Figure 1:
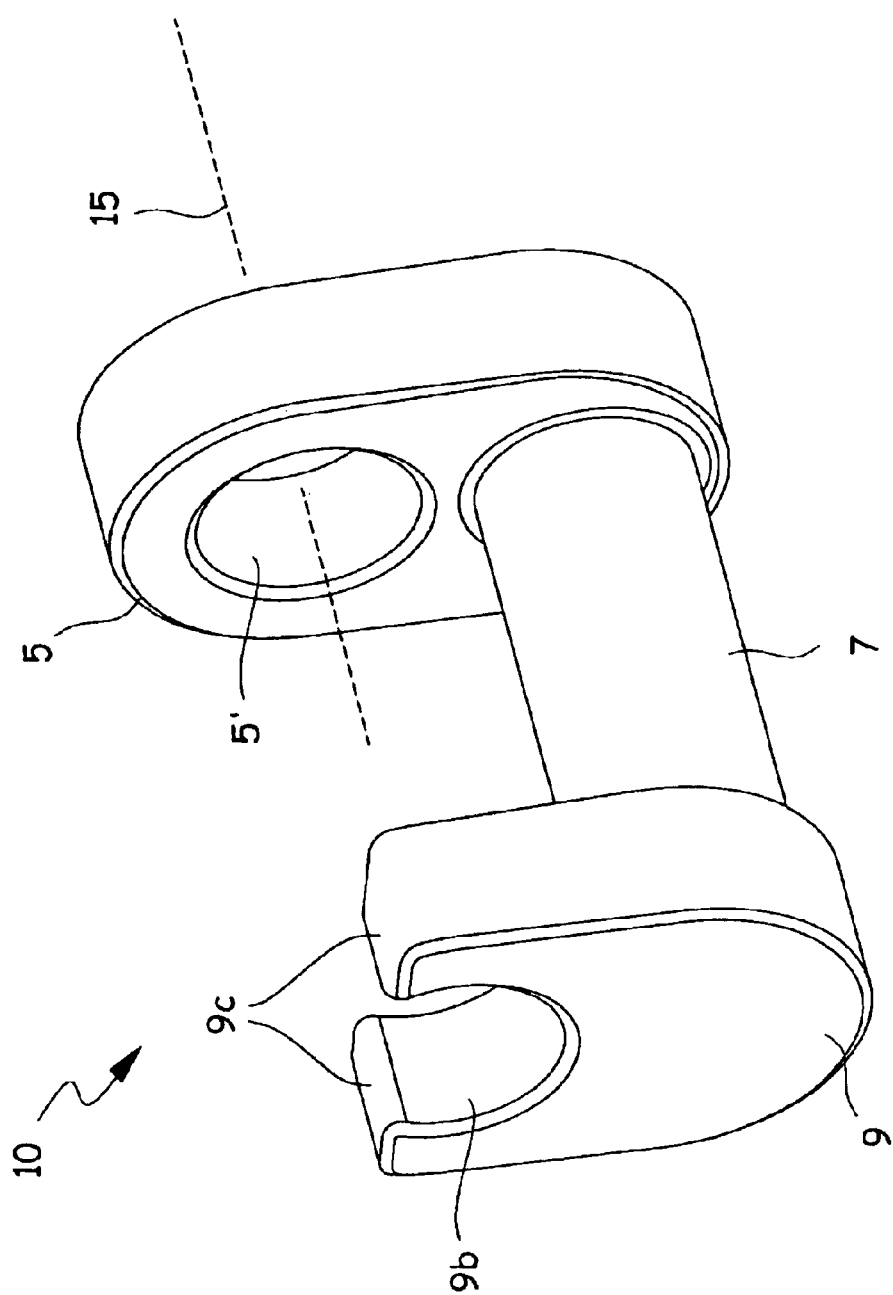
FIG. 1 shows an embodiment of a connector of the disclosure.

FIG. 1 shows an embodiment of a line connector 10 of the disclosure having a line attachment portion 5 by which a line 12 (see FIG. 4), such as a cord or wire, may be attached (see also FIG. 4) and thereby define a line axis 15. In this case, the line attachment portion 5 simply comprises an opening 5b adapted to receive the line. Of course, any suitable type of line attachment known in the art may be used. Alternatively, the line 12 may be a part of the connector 10 itself by simply molding a plastic line and connector as a single unit, in which case the line attachment portion 5 is simply the portion where the line ends and the connector begins.

The line connector 10 also has a snap-in portion 7 and a snap-on portion 9. In the embodiment shown, the snap-in portion 7 is a shaft, optionally cylindrical, and the snap-on portion 9 defines an opening 9b adapted to receive and attach to the snap-in portion 7 of another connector. The terms "snap-on" and "snap-in" are used because a simple "snap-on" type of attachment is anticipated for most uses, but of course other types of attachment may be substituted. The "snap-on" attachment is effected by providing one or more protuberances 9c that cause the mouth of the opening 9b to be smaller than the snap-in portion 7, thereby requiring the resilient material to give way as the snap-in portion 7 is received into the opening 9b, but which, by virtue of the shape of the snap-in portion 7, substantially returns to its original configuration once the snap-in portion 7 is full in place.

Figure 2:
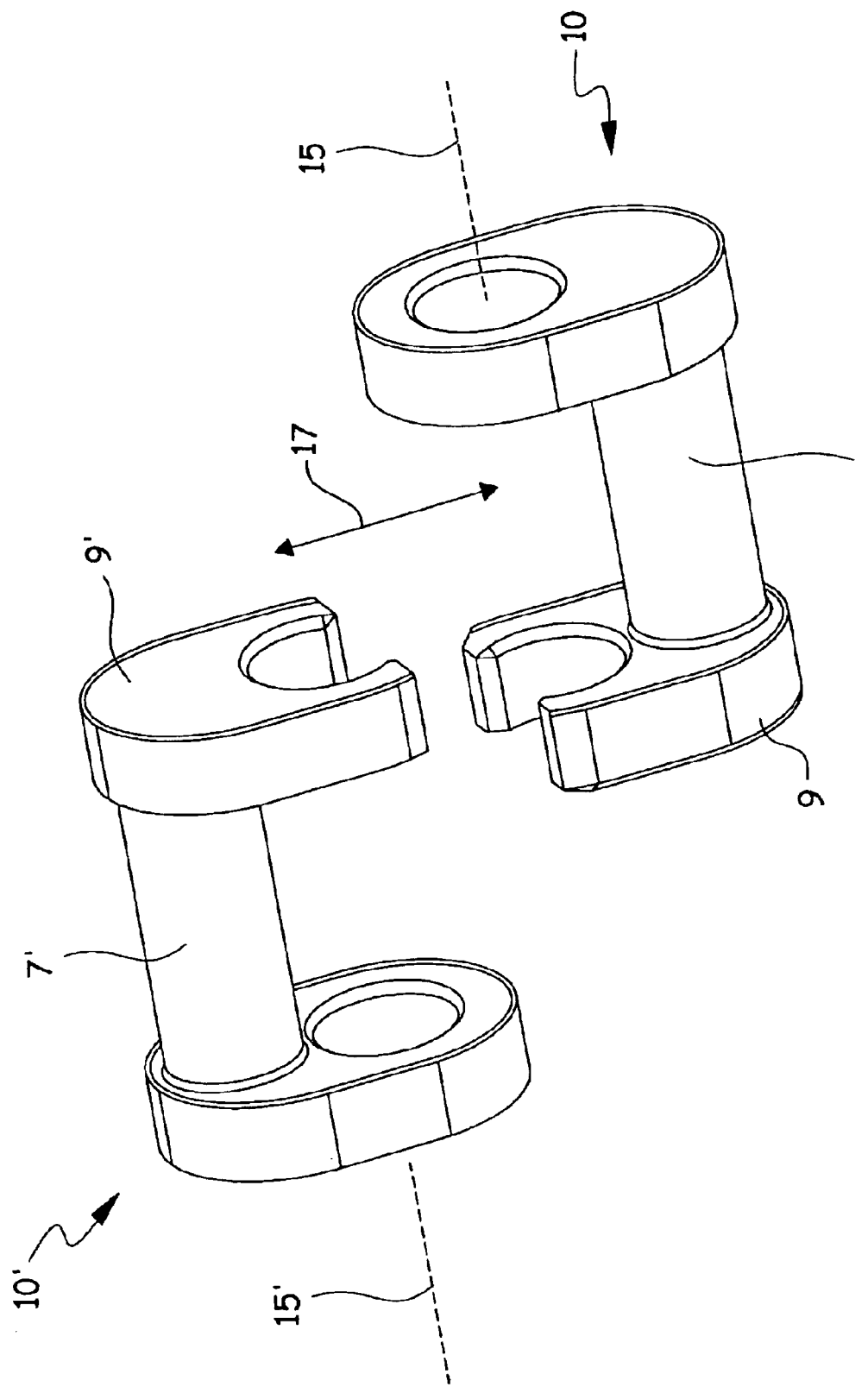
FIG. 2 shows a pair of connectors unattached.

Referring to FIG. 2, there is shown a pair of connectors 10, 10' spaced part and ready to be connected so as to cause their respective lines (not shown) to be attached. For the embodiment shown, this is achieved by positioning each line connector 10, 10' for movement toward one another along a direction of attachment 17 such that the snap-in portions 7, 7' of each engage and attach to the snap-on portions 9,9' of the other. Note that in the embodiment shown, the direction of attachment is substantially perpendicular to the line axes 15, 15'.

Figure 3:
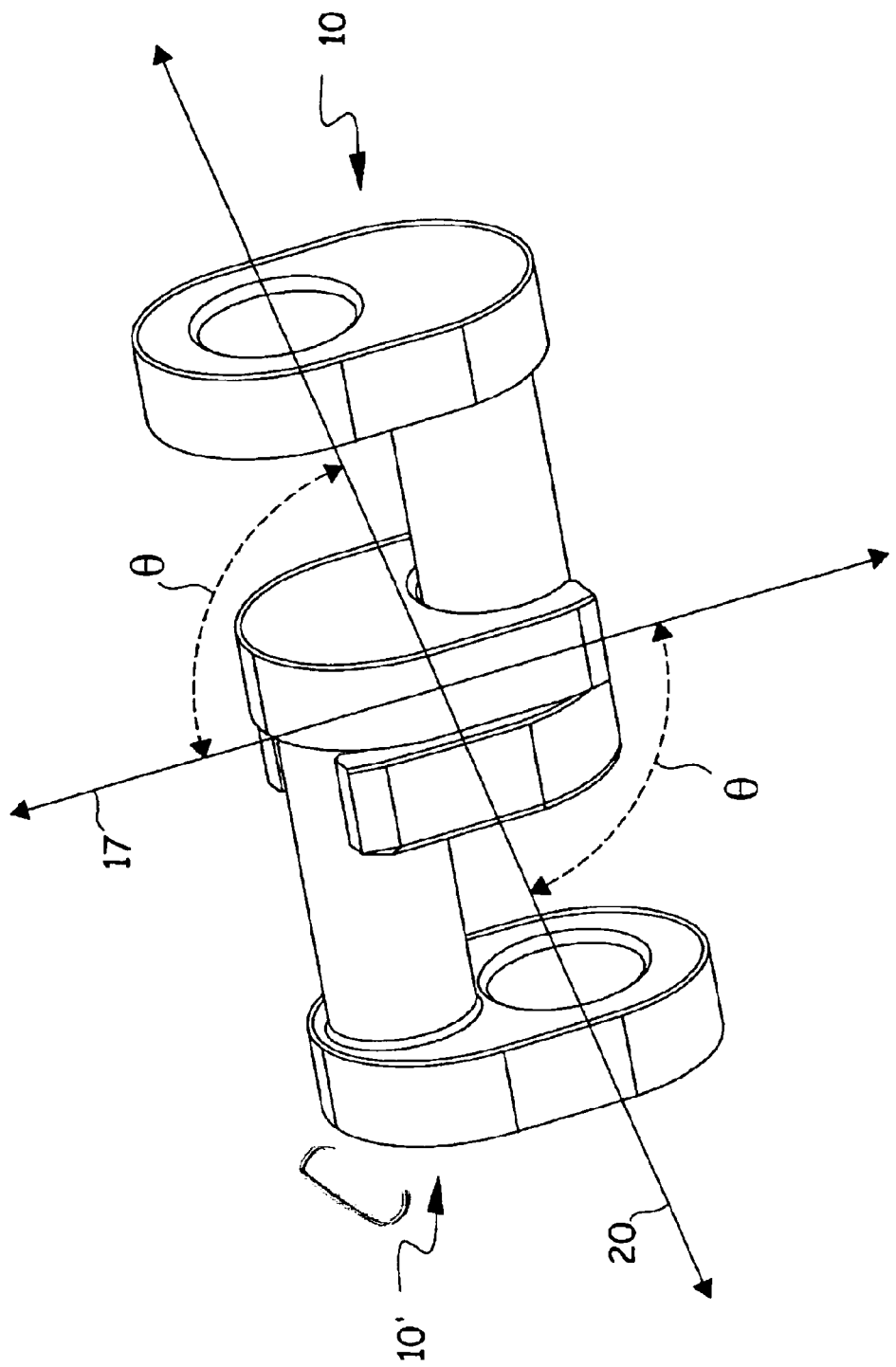
FIG. 3 shows a pair of connectors in attachment.

Referring to FIG. 3 there is shown the line connectors 10, 10' in a state of attachment wherein the snap-in portions 7, 7' of each are engaged and attached to the snap-on portions 9,9' of the other. An axis of line tension 20 is now defined which is the axis along which tension upon the connectors is applied when the lines are pulled apart.

Note that, in the embodiment shown, the line axes 15, 15' of the line attachment portions 5, 5' are not congruent, though parallel, such that the axis of line tension is not quite parallel to the line axes. This is purely optional, it being a simple matter to design the line attachment portions 5, 5' so that the line axes are superimposed with one another and the axis of line tension. Regardless, it is desirable that the angle θ for each connector between the direction of attachment 17 be less than or about 90 degrees to the axis of line tension 20. This is so that tension placed on the lines will not cause the connectors 10, 10' to be pulled apart. In fact, an angle less than 90-degrees is superior in preventing the connectors from being pulled apart.

Note also that in the embodiment shown, the snap-in portions 7, 7' are longer than needed to make the connection. This provides leverage for the user to make it easier to twist the two connectors 10, 10' apart. For smaller applications, the connectors may be twisted apart with one hand.

Figure 4:
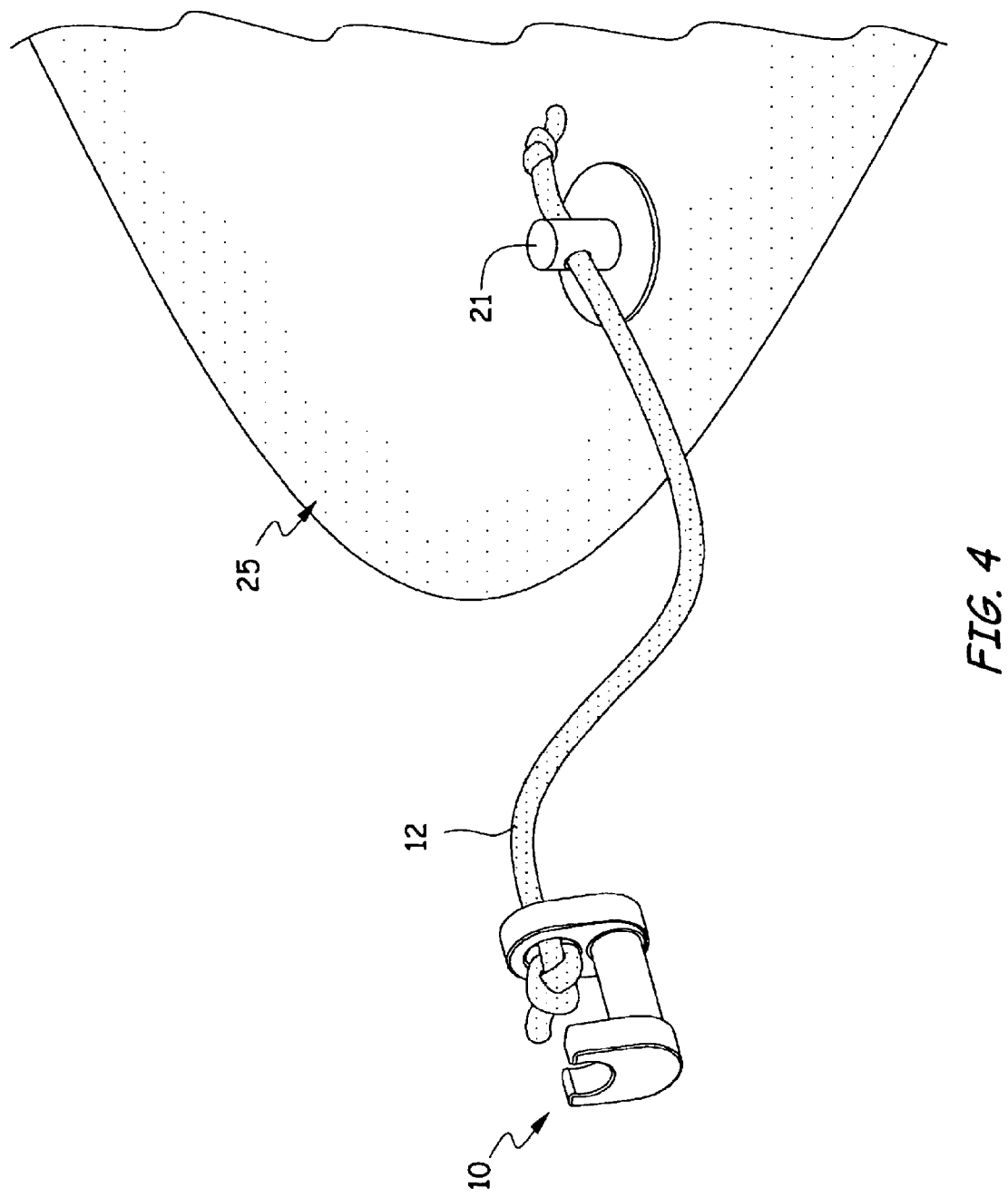
FIG. 4 shows a connector attached to an inflatable by a line.

Referring now to FIG. 4, there is shown a line connector 10 attached to a line 12, which is attached to on object 25, such as a flotation device. A point of attachment 21 is provided to attach the line to the object.

The connector 10 of the disclosure will preferably be made of a resilient material, such as a polymer plastic, so as to enable the use of the "snap-on" feature. Of course, to effect a "snap-on" capability, only one of the other of the snap-on 9 or snap-in 7 portions need be resilient, but molding the entire connector of the same material is easier and more cost efficient. Nevertheless, for heavy loads, it may be found necessary to use different materials for different portions of the connector or even to abandon a "snap-on" type of attachment altogether.

While various values, scalar and otherwise, may be disclosed herein, it is to be understood that these are not exact values, but rather to be interpreted as "about" such values, unless explicitly stated otherwise. Further, the use of a modifier such as "about" or "approximately" in this specification with respect to any value is not to imply that the absence of such a modifier with respect to another value indicated the latter to be exact.

Changes and modifications can be made by those skilled in the art to the embodiments as disclosed herein and such examples, illustrations, and theories are for explanatory purposes and are not intended to limit the scope of the claims. Further, the abstract of this disclosure is provided for the sole purpose of complying with the rules requiring an abstract so as to allow a searcher or other reader to quickly ascertain the subject matter of the disclosures contained herein and is submitted with the express understanding that it will not be used to interpret or to limit the scope or the meaning of the claims.

What is claimed is:

1. A combination, comprising:
    a first line connector, comprising:
        a first line attachment portion defining a first line attachment location;
        a first snap-in portion connected to the first line attachment portion and arranged at a first offset from the first line attachment location; and
        a first snap-on portion connected to at least one of the first snap-in portion and the first line attachment portion;
    a second line connector, comprising:
        a second line attachment portion defining a second line attachment location;
        a second snap-in portion connected to the second line attachment portion and arranged at a second offset from the first line attachment location; and
        a second snap-on portion connected to at least one of the second snap-in portion and the second line attachment portion;
    wherein the first line connector and the second line connector are configured and arranged such that, to connect the first and second line connectors, the first snap-on portion attaches to the second snap-in portion and the second snap-on portion attaches to the first snap-in portion along a direction of attachment; and
    wherein the first offset and the second offset are positioned such that, when a first line is attached to the first line attachment location and a second line is attached to the second line attachment location, and tension is applied to the first and second lines, the snap-in portions and snap-on portions are urged in the direction of attachment.

2. The combination of claim 1, wherein the first and second snap-in portions each comprise a shaft.

3. The combination of claim 2, wherein each shaft extends substantially perpendicular to a respective snap-on portion, and each snap-on portion defines an opening for receiving the shaft of the other line connector.

4. The combination of claim 1, wherein, when a first line is attached to the first line attachment location and a second line is attached to the second line attachment location, each line defines a line axis extending substantially parallel to the respective snap-in portion, and wherein the two line axes are not congruent with one another.

5. The combination of claim 1, further comprising the first line, and wherein the first line is molded to the first line attachment location.

6. The combination of claim 5, further comprising the second line, and wherein the second line is molded to the second line attachment location.

7. A combination, comprising:
    a first line connector, comprising:
        a first line attachment portion defining a first line attachment location;
        a first shaft having first and second ends and connected to the first line attachment portion at a first end and arranged at a first offset from the first line attachment location; and
        a first snap-on portion connected to the second end of the shaft;
    a second line connector, comprising:
        a second line attachment portion defining a second line attachment location;
        a second shaft having third and fourth ends and connected to the second line attachment portion at the third end and arranged at a second offset from the first line attachment location; and
        a second snap-on portion connected to the second shaft at the fourth end;
    wherein the first line connector and the second line connector are configured and arranged such that, to connect the first and second line connectors, the first snap-on portion attaches to the second shaft and the second snap-on portion attaches to the first shaft along a direction of attachment; and
    wherein the first offset and the second offset are positioned such that, when a first line is attached to the first line attachment location and a second line is attached to the second line attachment location, and tension is applied to the first and second lines, the shafts and snap-on portions are urged in the direction of attachment.

8. The combination of claim 7, wherein each shaft extends substantially perpendicular to a respective snap-on portion.

9. The combination of claim 7, wherein, when a first line is attached to the first line attachment location and a second line is attached to the second line attachment location, each line defines a line axis extending substantially parallel to the respective shaft, and wherein the two line axes are not congruent with one another.

10. The combination of claim 7, further comprising the first line, and wherein the first line is molded to the first line attachment location.

11. The combination of claim 10, further comprising the second line, and wherein the second line is molded to the second line attachment location.

12. The combination of claim 7, wherein each snap-on portion receives the respective shaft laterally.

13. The combination of claim 7, wherein the shaft is of a length effective in allowing a user enough leverage to pry the shaft from the snap-on portion.

* * * * *